Figure 4:
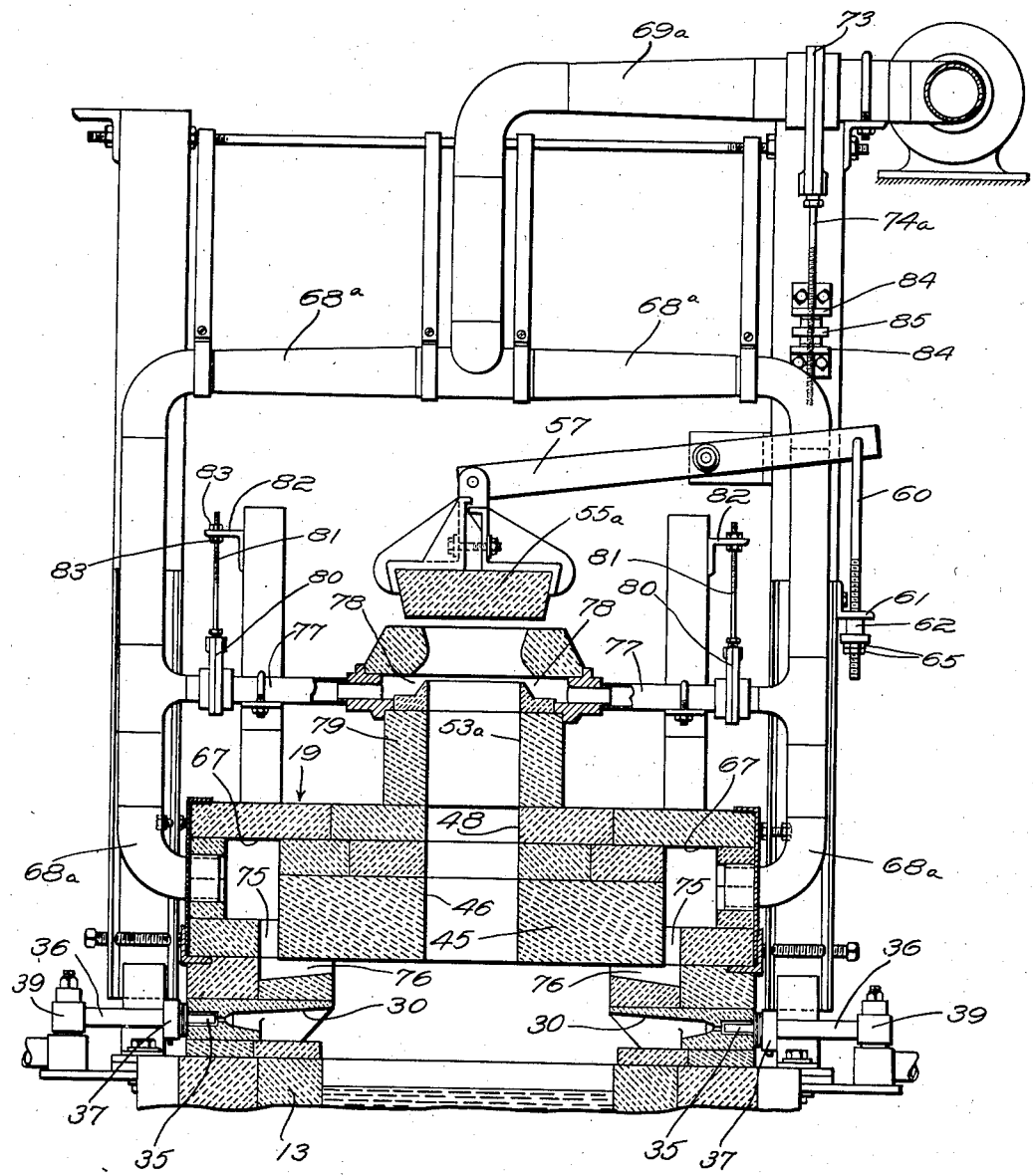

Jan. 24, 1939.   W. T. HONISS   2,144,973
FOREHEARTH FOR MOLTEN GLASS
Filed April 1, 1937   3 Sheets-Sheet 1
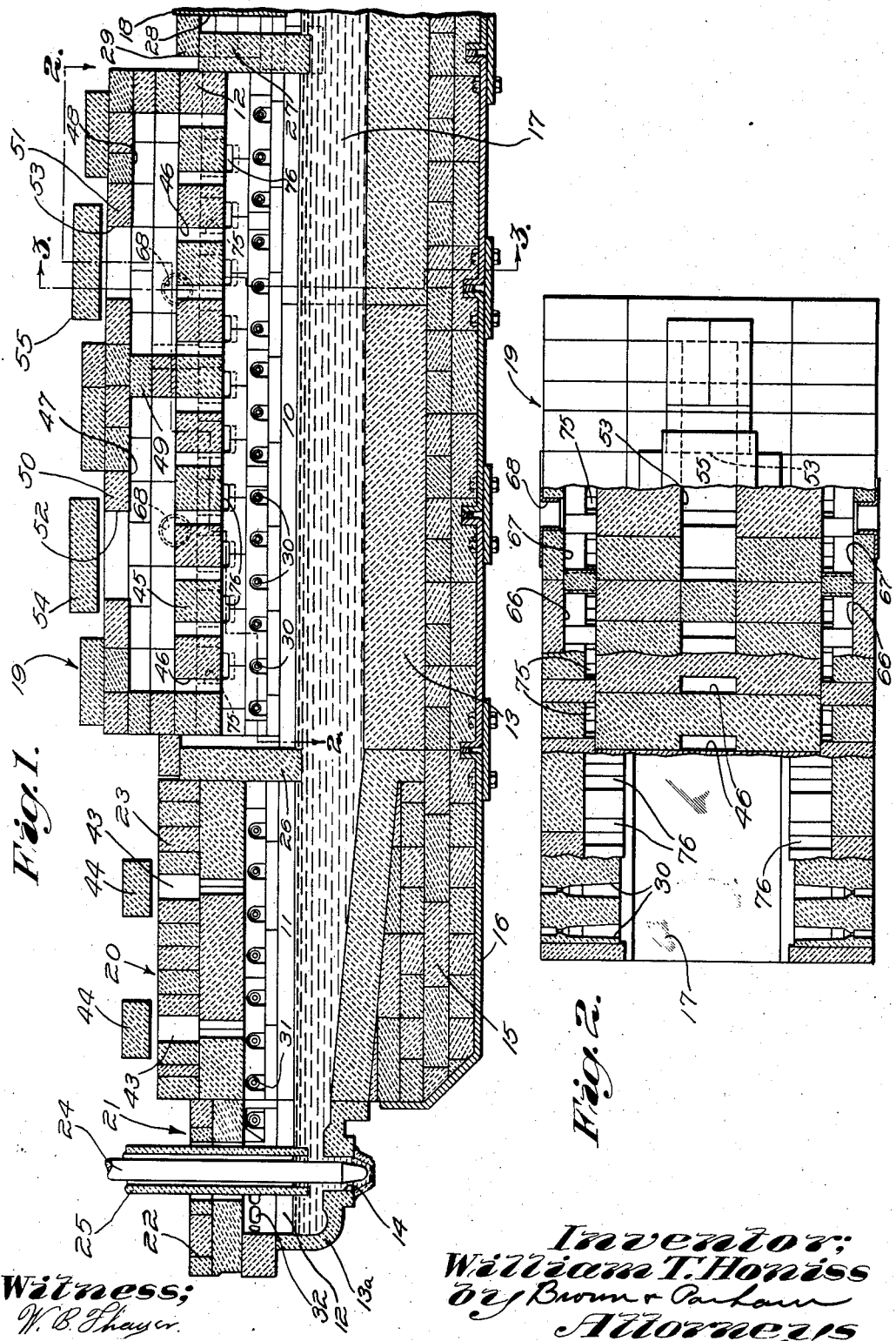

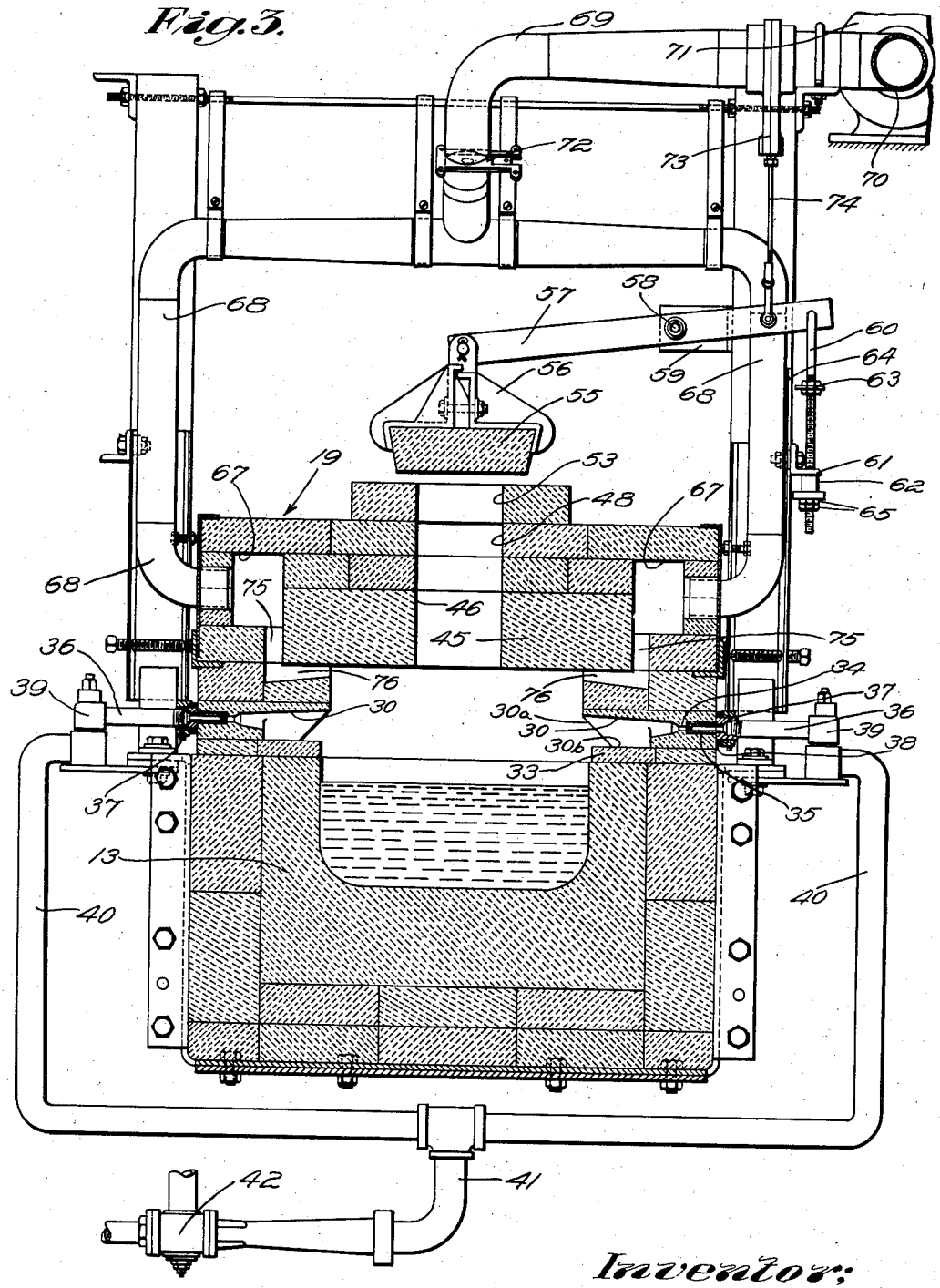

Patented Jan. 24, 1939

2,144,973

UNITED STATES PATENT OFFICE 2,144,973

FOREHEARTH FOR MOLTEN GLASS

William T. Honiss, West Hartford, Conn., assignor to Hartford-Empire Company, Hartford, Conn., a corporation of Delaware Application April 1, 1937, Serial No. 134,331

14 Claims. (Cl. 49—54)

This invention relates to improvements in forehearths for receiving molten glass from a melting tank or like source of supply and for conducting such glass to a delivery chamber, such as a feed bowl or basin, located at the outer end of the forehearth, and from which glass is to be fed, gathered or otherwise removed.

The invention relates more particularly to improvements in forehearths of that type which have a rear so-called cooling section and an outer or forward so-called heating or homogenizing section, the outer end portion of which constitutes the delivery chamber of the forehearth.

In the operation of the forehearth of this type, the temperature of the glass is regulated in the cooling section, mainly by cooling, with a view to obtaining for all the glass leaving the cooling section an average temperature corresponding to the temperature desired at the outlet or point of removal of glass from the delivery chamber. During the travel of such glass through the outer or homogenizing section, an attempt is made to eliminate temperature differences between different portions of the glass while preventing or compensating for further loss of heat from the glass. This is done by applying a regulated amount of heat to the glass in the homogenizing section, the object being to allow all the glass to even out as to temperature, or uniformly attain the temperature desired and to be homogeneous while in the delivery chamber or at least when in that portion of the delivery chamber that contains the feed outlet or place at which glass is to be removed.

Since the glass moving from a melting tank or like source of supply through the forehearth to the delivery chamber tends to become cooler and to flow more slowly next to the walls of the forehearth channel, it is usual to provide some means in an attempt to bring the temperature and rate of flow of the side or edge portions of the stream and of the remainder of the stream into substantial correspondence. Such means may comprise means for permitting cooling of the middle portion of the glass, as by radiation through the top wall of the cooling section of the forehearth while heat loss from the glass of the side or edge portions of the stream is substantially reduced or opposed, as by the application of heat thereto.

The temperature of the glass passing from the refining end of a melting tank or like source of supply to a forehearth usually is higher than that desired at the outlet or point of removal of glass from the delivery chamber. The reduction of temperature to be effected may be relatively slight, as when the glass to be fed or otherwise removed is to be at a relatively high temperature, suitable for the production of small charges which are to be manufactured into small articles of glassware. When the charges are relatively large, as for the manufacture of larger articles of glassware, the reduction of temperature is greater and may be as much as 300 to 400 degrees greater than the reduction required for charges for small ware. Also, the temperature of the glass entering the forehearth may be different in different installations and even at different times in the same installation. Still further, the factors governing the condition of the glass will be different when the output of glass from the delivery chamber per unit of time is varied, even though there has been no change of temperature in the glass entering the forehearth and the same temperature is desired at the feed outlet or point of delivery of glass from the delivery chamber.

All these matters heretofore have made it very difficult, if not impossible, to provide in any one forehearth suitable structure and glass temperature conditioning and controlling means which would be effective to adapt that forehearth for satisfactory use at different times and under different sets of conditions. Thus, if a forehearth were adapted economically to effect the reduction of temperature required for the feeding of charges of low weight, such a forehearth would lack facilities for effecting the still greater reduction of temperature that would be required when the size of the charges was substantially increased or when a change of output of glass from the delivery chamber or a change of temperature of the glass entering the forehearth made necessary such a relatively great reduction of temperature. Likewise, a forehearth that was well adapted for the lowering of temperature of the glass passing therethrough to the extent required for the delivery of relatively heavy charges of glass at a relatively low temperature has not been satisfactory for economical and efficient operation when the reduction of temperature is to be substantially decreased.

An object of the present invention is to provide a forehearth which will be universal in that it is adapted economically and efficiently to condition and regulate the temperature of the glass therein to meet all the different conditions of service which may be encountered from time to time in the use of such forehearth for the feeding or delivery of glass charges which will be suitable for manufacture into articles of glass ware of any size that is likely to be desired in any commercial operation. In other words, it is the object of the invention to provide a forehearth that is sufficiently adjustable or flexible in its glass conditioning and temperature control aspects to feed or deliver glass charges of suitable temperature and condition for the smallest article of glassware at one time and for the largest article of glassware at another time, at any rate at which feeding or delivery of such charges is required in practice and irrespective of any change of temperature of the glass entering the forehearth that is likely to be encountered in practice.

A further object of the invention is to provide a forehearth which, particularly in the rear or cooling section thereof, has temperature regulating and control means operative to provide a greater range of reduction of temperature of the glass passing therethrough than has been practicable in the operation of any prior forehearth.

A further object of the invention is the provision in a forehearth of the character described of a novel means for effecting intensified or enhanced cooling of the glass passing through the cooling section of the forehearth while at the same time permitting the application to the side or edge portions of the glass of sufficient heat to secure the desired uniformity of temperature and condition of the glass throughout the cross section of the stream.

A still further object of the invention is to provide in a forehearth of the type described a means operable at will for increasing the cooling of the glass passing through the cooling section to the forehearth by the application of a cooling fluid, such as air, to the under surface of the top structure of the cooling section without disturbing desirable pressure conditions in such cooling section and without directing such cooling fluid onto the glass.

A still further object of the invention is the provision in a forehearth of the type described of cooperative means for applying cooling air to the under surface of the top wall of the cooling section and simultaneously adjusting the output or exhaust of such cooling air and other gases from the cooling section to compensate for any change in the volume of the cooling air.

Other objects and advantages of the invention will hereafter be pointed out or will become apparent from the following description of particular embodiments of the invention, as shown in the accompanying drawings, in which Figure 1 is a longitudinally vertical section through a forehearth provided with glass temperature controlling and conditioning means according to the present invention;

Fig. 2 is a view of the top structure of the cooling section of the forehearth, partly in plan and partly in horizontal sections at several different planes, as indicated by the irregular line 2—2 of Fig. 1;

Fig. 3 is a transverse vertical section through the cooling section of the forehearth substantially along the line 3—3 of Fig. 1 and showing novel means that the invention provides for applying cooling air to the underside of the top of this portion of the forehearth; and Fig. 4 is a view similar to Fig. 3 but showing a modified form of mechanism for applying the cooling air and controlling the pressure conditions within this portion of the forehearth.

Referring now more particularly to Fig. 1, a forehearth is shown as comprising a rear or so-called cooling section 10 and an outer or forward so-called heating or homogenizing section 11. The outer end portion of the section 11 constitutes a delivery chamber, designated 12.

The side walls and bottoms of the forehearth sections 10 and 11 are formed of suitable refractory blocks or members suitably connected to constitute a refractory flow channel 13. The outer end portion of this flow channel, indicated at 13a, is shown as being a refractory feed bowl which is provided at its bottom with a feed outlet 14. The refractory channel 13 is suitably insulated at all places desired, as by the insulating brick 15 which may be confined and held in place against the refractory channel by a suitable metallic casing, such as indicated at 16.

In Fig. 1, the feed bowl 13a lacks insulation, but it will be understood that in actual practice, insulation of any suitable kind may be applied and held in place in any suitable known way. Also, in actual practice, suitable supporting structure (not shown) will be provided for the forehearth and the forehearth will be so located with respect to a melting tank or like source of supply that glass will be supplied continuously in a stream, as indicated at 17 in Fig. 1, from the source of supply to the forehearth. The flow channel thus will be continuously filled with molten glass to a predetermined level, sufficient to maintain over the feed outlet a body of glass of sufficient depth for the feeding operations.

Only a fragmentary portion of a wall of the melting tank is shown, the same being indicated at 18 in Fig. 1, as the present invention does not require any novel or special way of connecting the forehearth flow channel with the source of supply and ways of accomplishing this result are well known in the art.

The forehearth includes a cover or top structure, comprising a section 19 at the top of the rear or cooling section 10, a section 20 at the top of the heating or homogenizing section 11, and a section 21 at the top of the delivery chamber 12. Preferably the cover structure of the forehearth is so constructed as to provide substantially flat top walls for the several sections of the forehearth. The refractory inner walls of the section 21 of the cover structure may have suitable insulating brick laid thereover, as indicated at 22, Fig. 1. The refractory inner walls of the section 20 of the cover structure likewise may have insulating bricks superimposed thereon, as indicated at 23, Fig. 1.

A suitable vertical opening may be formed through the section 21 of the cover structure above the delivery chamber to accommodate suitable mechanism for controlling the feeding of glass through the outlet 14, such mechanism being represented by the vertical refractory plunger 24 and the vertical refractory tube 25. Since feeding mechanism, including these parts, forms no part of the present invention and is well known in the art, no further illustration or description thereof is required.

The heating or homogenizing section of the forehearth may be separated, above the level of the glass in the forehearth channel, from the rear or cooling section 10 by a transverse refractory separator block 26. The space above the glass in the rear or cooling chamber 10 likewise may be separated from the space above the glass in the associate melting tank or source of supply by a rear transverse refractory block, such as indicated at 27. This block may be spaced slightly from the adjacent wall 18 of the associate melting tank to provde a space, such as indicated at 28, for the sting-out of heated gases, the outlet at the top of this space being controlled by a suitable movable refractory cover block 29.

The sections 10 and 11 and the delivery chamber 12 at the outer end of the latter may be provided with suitable heating means, preferably such as are included in the embodiment of the invention disclosed and claimed in the copending application of Karl E. Peiler and William T. Barker, Jr., Serial No. 134,356, filed April 1, 1937, which is owned by the owner of the present application. As shown, such heating means include closely spaced firing or combustion tunnels 30 located in the side walls of the cooling chamber 10, similar firing or combustion tunnels 31 in the side walls of the heating chamber 11 as far outwardly of the latter as the delivery chamber 12 and spaced firing or combustion tunnels 32 of a somewhat different form in the walls of the delivery chamber 12. All these firing or combustion tunnels are shown in Fig. 1 as being located a predetermined distance above the level of the glass in the forehearth. The sections 20 and 21 of the forehearth cover structure are closer to the level of the tunnels 31 and 32 than is the section 19 to the tunnels 30 of the cooling section of the forehearth.

It will be noted from the showing of the firing or combustion tunnels 30 in Figs. 2 and 3 that each is substantially enlarged at its inner end portion, has its inner end downwardly and outwardly beveled, as at 30a, and has its bottom wall cut away for a substantial distance outwardly of this beveled portion, as indicated at 30b, Fig. 3, the effective bottom of the outer end portion of the firing or combustion tunnel being the exposed surface of the underlying or supporting refractory block 33.

Each firing or combustion tunnel 30 has a reduced inlet, indicated at 34 in Fig. 3, at the inner end of a counterbore in which is disposed the tip 35 of a nozzle 36. This tip 35 is connected with the body of the nozzle 36 by a suitable coupling 37 which also secures a suitable packing substance, such as a refractory cement or clay luting 38, against the outer end of the block containing the firing or combustion tunnel. In this way, external air is excluded from the inlet 34 of the firing or combustion tunnel.

The nozzles 36 for the several tunnels 30 at each side of the cooling section 10 may be connected with a manifold 39. Branches 40 of a fuel supply pipe 41 supply fuel to the manifolds 39. The latter distribute the fuel to the several nozzles 36 by which such fuel is supplied to the firing or combustion tunnels. The fuel pipe 41 may be provided with a suitable premixing device 42, so that the fuel supplied will be premixed gas and air of a predetermined gaseous composition and under a predetermined pressure. Since external air is excluded from the outer ends of the firing or combustion tunnels, uniformity of the pressure and gaseous composition of the fuel mixture supplied to the several tunnels may be had and such pressure and gaseous composition may be predetermined and selected so that complete combustion of the mixture supplied to each tunnel will take place therein. This will effect heating of the walls of the inner end portion of each tunnel and adjacent thereto. The side or edge portions of the glass stream in the cooling section thus will be heated by radiation from these walls without the necessity of applying flames to the glass and hence without the irregularity of heating effects that would be incident to the presence of flames at spaced places within the forehearth.

Separate means, generally similar to that shown in Fig. 3 as above described, may be provided for supplying premixed gas and air to the tunnels 31 of the heating section 11 and to the tunnels 32 of the delivery chamber 12. As such means do not, per se, form part of the present invention, no further disclosure thereof need be given herein.

The combustion of the premixture of gas and air delivered to the tunnels of the various sections of the forehearth may be complete in such tunnels. The different portions of the glass stream in such sections of the forehearth then will be heated mainly by heat radiated from walls at the inner ends of the tunnels, the shape of the tunnels 30 and 31 being such as to direct the radiated heat downwardly onto the edge of side portions of the glass stream. The inner end portions of the tunnels 32 are enlarged laterally and so shaped as to distribute the application of radiant heat.

The spent gases in the heating chamber 11 may be removed therefrom through vents 43 in the section 23 of the cover structure of the forehearth. These vents preferably are located along the longitudinal median line of the top of the section 11. The pressure conditions within the section 11 as well as the rate of exhaust of the spent or heated gases may be regulated by movable cover blocks or dampers 44. The means for operating the cover blocks 44 to vary the effective size of the outlet ends of the vents 43 may be substantially as shown in Fig. 3 for a similar closure that is associated with the cooling section 10 of the forehearth and which will be hereinafter described.

As described so far, the structure is substantially as shown in the copending application of Karl E. Peiler and William T. Barker, Jr., Serial No. 134,356, as aforesaid, which fully discloses and contains claims for patentably novel features thereof. Such structure has been described herein because it is particularly well adapted for cooperation with structure, hereinafter to be described, to produce a complete forehearth by which the objects of the present invention may be attained.

As shown, the section 19 of the cover structure for the cooling section 10 of the forehearth comprises refractory blocks arranged to constitute a flat crown 45 for the space above the glass in such cooling section. Closely spaced vertical vents or exhaust ports 46 are provided in this crown 45, preferably in the longitudinal median portion thereof. The vents 46 in approximately the forward half of the crown 45 open at their upper ends into a longitudinally extending manifold or common exhaust space 47. The remaining vents 46 open into a similar rear manifold or longitudinal exhaust space 48. The walls of these two manifolds or exhaust spaces, as well as the partition therebetween, which is designated 49, Fig. 1, preferably include insulating brick above the crown 45. The top of the manifold 47 is designated 50 while that of the manifold 48 is designated 51.

A final discharge outlet 52 is provided in the top wall 50 of the manifold 47 and a similar opening 53 is provided in the top wall 51 of the manifold 48. The final exhaust outlets 52 and 53 are controlled by movable closures or dampers 54 and 55, respectively, each of which may be an insulating block having the requisite refractory characteristics.

Similar means are provided for adjustably supporting each closure 54 or 55, so that its position with respect to the outlet that it controls may be adjusted. As shown in Fig. 3, the supporting means for the closure 55 comprises a suitable chuck or holder 56 carried by a lever 57 which is fulcrumed at 58 on a suitable supporting bracket 59. The outer end of the lever 57 is pivotally connected with an adjusting rod 60, the lower end portion of which depends through an opening in a stationary bracket 61. A nut 62 on this threaded rod will, by its contact with the bracket 61, limit the upward movement of the outer end of the lever 57 and thus support the closure 55 at a predetermined position with respect to its underneath exhaust outlet.

An index element, indicated at 63, on the rod 60, cooperates with a scale 64 on the bracket 61, or on any other suitable stationary support, so as to afford visual indication of the position of the closure block 55 relative to the exhaust outlet for any adjustment of the adjusting nut 62. Jam nuts 65 may be provided on the rod 61 to retain the adjusting nut 62 against accidental turning movement.

The section 19 of the cover structure of the forehearth is provided at each of its side portions with a pair of longitudinally aligned intake manifolds 66 and 67, respectively. These manifolds are formed in the walls of the cover section 19 by the use of suitable refractory and insulating brick or like material. Each manifold 66 and 67 is an intake manifold for cooling air with which it may be supplied from a branch pipe 68. Fig. 3 shows two of the branch pipes 68, respectively located at opposite sides of the forehearth cover structure and in communication with the manifolds 67. These branch pipes connect with a common cooling air supply pipe 69 which, in turn, communicates with a main cooling air supply pipe 70. Air under pressure is supplied to the latter, as from a blower fan 71. The pressure preferably should be non-fluctuating or at least should not vary sufficiently to interfere with the maintenance of a stable cooling action when the cooling air is in use.

An adjustable but normally stationary slide gate 72 in the pipe 69 provides a maximum passage through that pipe for any given adjustment of the gate 72. For decreasing the volume of cooling air passing through the pipe when the gate 72 is in any given adjustment, a slide valve 73 may be provided in the pipe 69 and may be connected by a suitable linkage, such as indicated at 74, with the outer end of the lever 57, so that an opening movement of the valve 73 will be effected simultaneously with the raising of the damper 55. Conversely, lowering of the damper 55 and a closing movement of the valve 73 will take place simultaneously. The linkage 74 is of such a construction as will permit a presetting of the damper 55 relative to the outlet 53 to allow exhaust through the latter of a predetermined volume of gases while the valve 73 is closed.

Each manifold 66 and 67 communicates through spaced passages 75 (see Figs. 1 and 3) with horizontal cooling air intake ports 76 in the side walls of the cooling section 10. The ports 76 are located closely adjacent to the flat under surface of the crown or top wall of the section 10. As will be best seen in Fig. 3, the bottom surface of each of these ports 76 is inclined upwardly toward its inner end, so that the blast of cooling air delivered therefrom will be directly upwardly against the top wall of the space in the cooling section 10. The cooling air thus will scrub across the under surface of the top wall to the vents 46 and will cool the top wall without changing the combustion or firing conditions in the firing or combustion tunnels which are located at a lower level and without impinging onto the glass. The lower surface of this top wall may be roughened in any suitable way and to any desired extent to increase the turbulence and diffusion of the air streams which scrub this wall. These ports 76 are flat, that is, have but very little depth at their inner ends as compared with their width. This further tends to localize the cooling action of the cooling air to the top wall of the cooling section of the forehearth and also tends to diffuse the cooling air sufficiently to effect substantial uniformity of cooling action on the under surface of the top wall when like quantities of air or like cooling characteristics are supplied by the several intake ports 76.

It will be noted that there are numerous ports 76 in each of the side walls of the cooling section 10 and it is preferred that the ports 76 which receive cooling air from each pair of oppositely located manifolds 66—66 or 67—67 will have its own control means, such as shown in Fig. 3 as applied to the manifolds 67—67 and as hereinbefore described. Hence, the pressure conditions and the application of cooling air to each of the approximately longitudinal half portions of the cooling section 10 of the forehearth may be independently regulated and controlled.

In the operation of a forehearth substantially as just described, the heating and cooling means associated with the rear or cooling section of the forehearth may be adjusted to take care of any contingency that is likely to be encountered in actual practice. For example, if the reduction of temperature of the glass passing through the forehearth is to be relatively slight, the control means governing the supply of heat to the so-called cooling section 10 may be adjusted to supply a relatively great amount of heat and the means for applying cooling air to the under surface of the top wall of the cooling section may be completely closed. As a further reduction of temperature is desired, the control means governing the application of heat may be turned down. This ordinarily will take place as the size of the charge is increased.

When the size of the charge is so great that the desired reduction of temperature cannot be effected merely by turning down the burners or, in other words, when the burners have been turned down as low as possible while still applying the required amount of heat to the side or edge portions of the glass, the means for applying cooling air to the lower surface of the top of the cooling section may be brought into operation. The adjustable mechanism for operating the closure 55 and the valve 73 for controlling the application of cooling air to the rear portion of the cooling section 10 may be brought into operation before like parts for controlling the closure 54 and the application of cooling air to the forward portion of the cooling section 10, or these two independently operable mechanisms may be brought into operation at substantially the same time and adjusted to the same or different extents. Each opening movement of a valve 73 will be attended by a similar opening movement of the corresponding closure 55 or 54. This will maintain substantially constant a pressure condition at each outlet suitable to cause a slight sting-out of heated gases or spent products of combustion and venting of the air that has been used to cool the forehearth top, irrespective of the volume of such air.

By the means and in the manner above described, the amount of reduction of temperature of the glass can be increased from a minimum until it is sufficient to take care of the requirements for charges which are suitable for manufacture into articles of the largest size to be made.

It will be observed that the exhaust spaces or manifolds 47 and 48 have a heat conserving or insulating effect or function when the cooling air is not being used and only heated gases are passing therethrough. Then, when cooling air is being employed to produce an enhanced cooling effect on the glass, these same spaces may serve as top cooling spaces.

In Fig. 4, a slightly modified form of mechanism for controlling the pressure condition in the cooling section of the forehearth is shown. The same reference characters will be used to designate like parts and the description of this modified structure will be confined to the parts thereof, which are different from that hereinbefore described.

A supply pipe 69a is similar to the pipe 69, Fig. 3, except that the said gate valve 72 of the latter is lacking. Branches 68a of the pipe 69a communicate as aforesaid with manifolds 67. These pipes, however, also have branches or bypasses in the form of Venturi tubes 77 which communicate with an internal annular slot 78 in a superimposed plural part ring structure 79 at the upper end of an outlet 53a. The latter corresponds generally with the outlet 53.

Valves 80 in the tubes 77 are adjustable by threaded rods 81 which extend through brackets 82 and are engaged at opposite sides of such brackets by nuts 83.

The outlet structure is controlled by a closure or damper 55a, similar to the closure or damper 55 and operable by a lever 57 and mechanism, such as hereinbefore described, for operating that lever.

In this form of construction, the valve 73 in the pipe 69a may be controllable separately from the lever 57, a rod 47a extending through suitable openings in brackets 84 and being engaged by a nut 85 that is located between these brackets. When cooling air is applied against the under surface of the top of the cooling section or the amount of the cooling air is varied, the valves 80, or a valve 80, may be opened more or less so as to bring the Venturi tubes 77, or either of them, into action, thereby causing a sufficient suction in the outlet 53a to exhaust the cooling air on the increased volume of cooling air while maintaining substantially constant a predetermined positive or plus pressure at the inner end of the outlet.

The operation of the modified form of the structure otherwise is similar to that hereinbefore given and need not be repeated.

The invention may be practically applied to advantage in forehearths having heating mechanisms and details of construction other than as shown in the accompanying drawings and hereinbefore particularly described. The invention, therefore, is not to be limited except as required by the prior art and extends to all such structures and methods as fairly fall within the scope of the appended claims.

I claim:

1. A forehearth for molten glass including a cooling section having a top structure through which heat radiated from the glass therebeneath may be dissipated, and means including longitudinal series of spaced ports in opposite sides of said cooling section close to the under surface of said top structure for applying to the latter cooling fluid under positive pressure to increase the dissipation of heat through said top structure.

2. A forehearth for molten glass including a cooling section having a top structure through which heat radiated from the glass therebeneath may be dissipated, an outlet in said top structure, means for regulably controlling the effective size of said outlet, means for applying a cooling fluid under positive pressure to the under surface of the top structure, and means for regulably controlling the application of said cooling fluid to said under surface of the top structure to vary the rate of heat dissipation by said top structure.

3. A forehearth for molten glass including a cooling section having a top structure through which heat radiated from the glass therebeneath may be dissipated, an outlet in said top structure, means for regulably controlling the effective size of said outlet, means for applying a cooling fluid under positive pressure to the under surface of the top structure, means for regulably controlling the application of said cooling fluid to said under surface of the top structure to vary the rate of heat dissipation by said top structure, and means interconnecting the means for regulably controlling the effective size of said outlet and the means for regulably controlling the application of said cooling fluid for causing simultaneous regulation of these two control means.

4. A forehearth for molten glass including a cooling section having a top structure through which heat radiated from the glass therebeneath may be dissipated, said cooling section having series of spaced cooling air intake ports in the opposite side walls thereof close to the under surface of the top structure, said top structure having an exhaust outlet approximately midway between the intake ports in said opposite side walls, cooling air intake manifolds for the respective series of intake ports, and means for supplying cooling air under positive pressure to said manifolds.

5. A forehearth for molten glass including a so-called cooling section, controllable means for supplying cooling air to the interior of the cooling section adjacent to the top thereof when desired and for shutting off said cooling air at other times, said cooling section having a top structure formed to provide a longitudinally extending exhaust manifold in its middle portion, said manifold having longitudinally spaced vents in its bottom to establish communication between said manifold and the interior of said forehearth section, said manifold also having a final exhaust outlet in its top at a place approximately intermediate the ends of said manifold, whereby said manifold will function as a top cooling space when sufficient cooling air is being applied to the interior of said cooling section and as a heat conserving or insulating space when less or no cooling air is being so applied.

6. A forehearth for molten glass including a cooling section having a top structure formed to provide a longitudinally extending exhaust manifold in its middle portion, a series of spaced vents in said middle portion between said exhaust manifold and the interior of the cooling section and a final exhaust outlet between the exhaust manifold and the atmosphere, a pair of cooling air intake manifolds at opposite sides of said exhaust manifold, series of cooling air intake ports in the side walls of said cooling section close to the under surface of said top structure and respectively in communication with said cooling air intake manifolds, means for supplying cooling air to said intake manifolds, a damper for said final exhaust outlet, a valve for said means for supplying cooling air to said intake manifolds, and means for adjusting said damper and said valve simultaneously.

7. A forehearth for molten glass including a cooling section having a top structure formed to provide a longitudinally extending exhaust manifold in its middle portion, a series of spaced vents in said middle portion between said exhaust manifold and the interior of the cooling section and a final exhaust outlet between the exhaust manifold and the atmosphere, a pair of cooling air intake manifolds at opposite sides of said exhaust manifold, series of cooling air intake ports in the side walls of said cooling section close to the under surface of said top structure and respectively in communication with said cooling air intake manifolds, means for supplying cooling air to said intake manifolds, a damper for said final exhaust outlet, and a valve for said means for supplying cooling air to said intake manifolds, said means for supplying cooling air to said intake manifolds including air conducting branches connected with said final exhaust outlet in such a manner as to constitute Venturi tubes for inducing a draft through said outlet.

8. A forehearth comprising cooling and heating sections having continuous glass conducting portions and separated above the level of the glass in such portions, means for applying heat to the glass in said heating section, means for applying heat to the side portions of the glass in the cooling section, and means for increasing the loss of heat from the remainder of the glass in the cooling section, comprising means for introducing cooling air under a positive pressure into the upper part of the cooling section above the means for applying heat to the side portions of the glass therein.

9. A forehearth for molten glass, including a cooling section having a top structure formed to provide a substantially flat under surface, heating means comprising spaced firing tunnels in each of the side walls of the cooling section, and means for producing therein practically complete combustion of a fuel mixture, said side walls of the cooling section also having spaced cooling air intake ports at a level located a substantial distance above the level of the firing tunnels and close to said under surface of the top structure, means for supplying cooling air under pressure to said intake ports, and an outlet in said top structure approximately midway between the air intake ports in the opposite side walls of the cooling section.

10. The method of controlling the temperature and condition of molten glass in a forehearth which comprises applying heat at the sides of a portion of the forehearth interior, varying the amount of such heat to vary from a minimum to a substantially greater amount the loss of heat from the glass therein by radiation through the top of the forehearth, and applying a cooling fluid under a positive pressure to the under surface of said top of the forehearth to produce a still further loss of heat from the glass by radiation through said top.

11. The method of controlling the temperature and condition of molten glass in a forehearth which comprises applying heat at a plurality of spaced places along each of the opposite sides of a portion of the forehearth interior, varying the application of heat at said places to vary from a minimum to a substantially greater amount the loss of heat from the glass by radiation through the top of said portion of the forehearth, and introducing cooling air under positive pressure into the upper part of the interior of said portion of the forehearth at spaced places along the sides thereof and above the level of the places of application of heat to reduce the temperature of said top and thereby to further increase the loss of heat from the glass through said top.

12. The method of controlling the temperature and condition of molten glass in a forehearth which comprises applying heat at a plurality of spaced places along each of the opposite sides of a portion of the forehearth interior, varying the application of heat at said places to vary from a minimum to a substantially greater amount the loss of heat from the glass by radiation through the top of said portion of the forehearth, introducing cooling air into the upper part of the interior of said portion of the forehearth at spaced places along the sides thereof and above the level of the places of application of heat to reduce the temperature of said top and thereby to further increase the loss of heat from the glass through said top, exhausting said cooling air and heated gases from said portion of the forehearth through an outlet in the middle portion of the top thereof, varying the cooling air introduced into said forehearth to vary the further increase of loss of heat from the glass, and varying the pressure conditions at said outlet in accordance with the variation of said cooling air.

13. The method of controlling the temperature and condition of molten glass in a forehearth which comprises delivering premixed gas and air to spaced firing tunnels located in the side walls of the forehearth, excluding external air from said firing tunnels and predetermining the pressure and composition of the premixture of gas and air in said firing tunnels to cause practically complete combustion of the premixture in said firing tunnels and thereby to heat the marginal edge portions of the glass in the forehearth mainly by heat radiated from the walls of the inner ends portions of the firing tunnels while permitting loss of heat from the middle portion of the glass in part of the forehearth by radiation through the top structure of that part of the forehearth, and increasing the loss of heat from the glass in said part of the forehearth by applying cooling air under pressure to the under surface of said top structure.

14. The method of controlling the temperature and condition of molten glass in a forehearth which comprises delivering premixed gas and air to spaced firing tunnels located in the side walls of the forehearth, excluding external air from said firing tunnels and predetermining the pressure and composition of the premixture of gas and air in said firing tunnels to cause practically complete combustion of the premixture in said firing tunnels and thereby to heat the marginal edge portions of the glass in the forehearth mainly by heat radiated from the walls of the inner end portions of the firing tunnels while permitting loss of heat from the middle portion of the glass in part of the forehearth by radiation through the top structure of that part of the forehearth, increasing the loss of heat from the glass in said part of the forehearth by applying cooling air under pressure to the under surface of said top structure, removing from the forehearth the cooling air and spent products of combustion while maintaining uniformity of pressure conditions at the inner ends of the firing tunnels, changing the volume of the cooling air to vary the increase of said loss of heat, and maintaining a predetermined pressure condition in the forehearth adjacent to the place of removal of said cooling air and spent products of combustion irrespective of a change in the volume of the cooling air.

WILLIAM T. HONISS.